United States Patent [19]

Haill

[11] 3,919,685

[45] Nov. 11, 1975

[54] SEISMIC DATA ACQUISITION SYSTEM AND METHOD

[75] Inventor: Harry K. Haill, Houston, Tex.

[73] Assignee: GEO Space Corporation, Houston, Tex.

[22] Filed: Nov. 26, 1973

[21] Appl. No.: 419,058

[52] U.S. Cl. ............. 340/15.5 GC; 330/51; 330/85; 330/124 R

[51] Int. Cl.$^2$ ....................... G01V 1/28; H03G 3/20

[58] Field of Search ......... 340/15.5 GC; 330/51, 85, 330/124 R

[56] References Cited

UNITED STATES PATENTS

| | | | |
|---|---|---|---|
| 2,935,697 | 5/1960 | McManis | 340/15.5 GC |
| 3,308,392 | 3/1967 | McCarter | 340/15.5 GC |
| 3,360,737 | 12/1967 | Harris et al. | 330/52 |
| 3,603,972 | 9/1971 | Vanderford | 330/51 UX |
| 3,700,871 | 10/1972 | Montgomery et al. | 340/15.5 GC |
| 3,742,489 | 6/1973 | Lefevre et al. | 330/51 UX |
| 3,813,609 | 5/1974 | Wilkes et al. | 330/51 |

*Primary Examiner*—Maynard R. Wilbur
*Assistant Examiner*—G. E. Montone
*Attorney, Agent, or Firm*—Daniel J. Meaney, Jr.

[57] ABSTRACT

A controlled gain amplification system adapted for use in a seismic data acquisition system including controllable input and output gates, a plurality of cascaded operational amplifiers, a vernier amplifier having several selectable predetermined gains for amplifying analog signals received from any one of the cascaded operational amplifiers to produce an output analog signal having an amplitude within a predetermined amplitude range, a reset amplifier for clamping the cascaded operational amplifier outputs to a stabilizing voltage level removing spurious signals from the output analog signal, a comparator and a control means for controlling in response to the comparator the transmission of the analog signal between the components forming the controlled gain amplifier, concurrently selecting the gain of the vernier amplifier and enabling the reset amplifier to clamp the each operational amplifier output to a selected voltage level is shown.

14 Claims, 14 Drawing Figures

SEISMIC DATA ACQUISITION SYSTEM AND METHOD

BACKGROUND OF THE INVENTION

1. Field of the Invention

This invention relates to novel and improved seismic data acquisition system and method, and in particular to an improved controlled gain amplification system for such a seismic data acquisition system. Also, a novel and unique method for acquiring seismic data is disclosed.

2. Description of the Prior Art

Seismic recording systems, digital recording systems and controlled gain amplification systems are known in the prior art. For example, U.S. Pat. Nos. 3,241,000 and 3,264,574 disclose certain of the known apparatus and systems.

Certain of the prior art seismic data systems and apparatus including those described above acquire and store seismic data as digital information on magnetic tape. Processing of the digital information and production of graphic indicia representing the seismic data so collected is generally performed at a central data processing center. If the collected data is of poor quality, or contains insufficient information or is otherwise unacceptable, it is necessary to re-acquire the seismic data at a later time in a manner to overcome the deficiencies of the unacceptable seismic data. Reacquisition of seismic data is expensive, time consuming and may yield still unacceptable seismic data.

In addition, during the collection of the seismic data, it is necessary to continually check the geophones and cables attached thereto for shorts, open circuits or leakage. Such defects or conditions affect the quality and collection of the seismic data. Accordingly, it is necessary to continually monitor or physically check the geophones and cables for such defects or conditions.

During collection of seismic data using known prior art seismic data acquisition systems, the amplification system used therein may produce and/or amplify spurious signals within the system and include the same in the digital signals produced thereby as representative of the seismic energy in the earth.

Description of the various known seismic data acquisition systems, apparatus, energy sources, geophones, amplification systems, computers and apparatus for processing of the acquired seismic data and methods and apparatus for producing graph indicia derived from the processed seismic digital data are well known in the art and need not be described in detail as part hereof.

SUMMARY OF THE INVENTION

The present invention relates to a seismic data acquisition and processing system and method. The preferred embodiment of the present invention is as a computer controlled seismic data acquisition and processing system adapted for use in remote locations. The amplification system disclosed herein is capable of removing spurious signals produced from within the controlled gain amplification system.

The seismic data acquisition of the present invention includes means for detecting seismic energy in the earth, a multiplexer, a controlled gain amplifier having a reset amplifier and a stabilizing voltage source, clamping means for removing spurious signals from the amplification stages of the amplifier, an analog-to-digital convertor, means for generating digital control signals and storing means. A computer transfer has input/output computer terminal, printer/plotter terminal and magnetic tape storage permit on-site seismic data processing.

The controlled gain amplification system includes input gating means, a plurality of operational amplifiers having a preselected gain and connected in series circuit relationship, output gating means, vernier amplifier having a plurality of selectable predetermined gains, a reset amplifier, a stabilizing voltage source, a comparator and controls means for controlling transmission of an amplified input signal within the amplifier to produce an output analog signal which has been amplified with a programmable gain to have an amplitude which is with a predetermined amplitude range which is less than the range within which the input signal amplitude may occur.

The seismic data acquisition method includes the steps of detecting seismic energy in the earth and producing analog signals in response thereto, gating the multiplexed analog signals to a controlled gain amplifier; controlling transmission of its amplified signal within the amplifier with an output gating means between operational/amplifier and a vernier amplifier, comparing the amplified analog signal to reference signal to produce a control signal to program amplification by the controlled gain amplifier, enabling the output gating means with the control signal, setting the gain of the vernier amplifier, clamping the operational amplifiers to stabilizing voltage, converting the analog signal to a digital detector signal, generating a digital control representing the programmed amplification of the output analog signal and storing the digital data signals and digital control signals.

The seismic data acquisition system of the present invention overcomes certain of the disadvantages of the prior art. The seismic data acquisition system of the present invention incorporates a controlled gain amplifier as part thereof wherein the output of each operational amplifier is clamped, in a programmed sequence through a reset amplifier, to a stabilizing voltage source. In this manner, spurious signals which would otherwise influence the magnitude of the amplified signal, and ultimately that of the output analog signal converted to a digital data signal, are eliminated. Also, digital data signals and digital control signals generated by the seismic data acquisition system are transferred between system components via a digital signal control means such as a unibuss. A digital computer having a central processing unit and a memory control the priorities, transferring and other functions performed on or with the digital information.

The seismic data acquisition system includes a floating point processor and bulk storage means, such as a disc file for storing and retrieving the digital signals. The digital computer, digital signal control means, floating point processor and disc file are incorporated into the system and are capable of directly receiving and processing the digital signals. With this seismic data processing capability located at the site where the seismic data is being acquired, the operator can immediately perform many functions on site which the known prior art system heretofore were incapable of performing.

The advantages of this capability are many. For example, the digital computer can sample each and every geophone and connecting cable and display and/or communicate to the operator the electrical condition of the geophone and cable. If a geophone or cable has a short, open circuit or is subject to electrical leakage beyond programmed limits or range, the operator is immediately so informed prior to collectin seismic data. Similarly, during the gathering of seismic data, if any of the above unacceptable conditions occurs, the system is capable of immediately advising the operator thereof and the exact cause of the condition. Collection of the seismic data can be stopped, the cause of the problem rectified, and the collection process continued.

After the desired seismic data is acquired, the operator under control of the digital computer can perform in the field seismic data processing of the digital signals and generate a graphic indicia of the seismic data to visually verify the same. Heretofore, this step of digital processing of seismic data needed to be performed at central data centers. If the seismic data is unacceptable, the operator is immediately advised thereof, corrective steps taken to overcome the problem, and the correct seismic data is immediately acquired.

This capability eliminates the significant expenses and time delay normally incurred in re-acquiring the seismic data. Thus, the operator is assured as to the quality and acceptability of the seismic data acquired on site and need not be dependent on a central seismic data processor to provide such information. Such a system enables an operator and seismic crew to increase both the quantity and quality of the seismic data so acquired at a more economical cost.

In addition to the above advantages, the operator of the seismic data acquisition system can routinely and accurately check and calibrate the system components thereby eliminating or substantially reducing errors therefrom. For example, the analog to digital convertor can be calibrated hourly or daily as desired. The floating point analyzer can be checked with routine maintenance programs on a daily basis. Further, digital data signals and digital control signals can be immediately stored on disc files rather than the slower speed magnetic tape file. Use of a disc file enables the digital computer to retrieve and store digital data thereon and to simultaneously control the transfer thereof between more than one component.

As the seismic data is acquired, the digital computer concurrently monitors critical system variables. If any of the variables, or operation of major components, falls outside of predetermined ranges or functions as programmed into the computer, the digital computer is capable of immediately advising the operator of such failure and can concurrently save or store the acceptable seismic data up to the failure point. In this manner, both valuable data and time are saved.

Therefore, it is an object of the present invention to provide an improved, digital computer controlled seismic data acquisition system capable of acquiring accurate correct data at an improved rate.

It is another object of this invention to provide an improved controlled gain amplification system for producing an accurate output analog signal.

It is yet another object of this invention to provide an improved method for acquiring seismic data in a digital format.

BRIEF DESCRIPTION OF THE DRAWING

The foregoing and other objects, features and advantages of the invention will be apparent from the following description of the preferred embodiment of the invention when considered together with the illustrations in the accompanying drawing which includes the following figures.

DESCRIPTION OF THE PREFERRED EMBODIMENT

Figure 1:
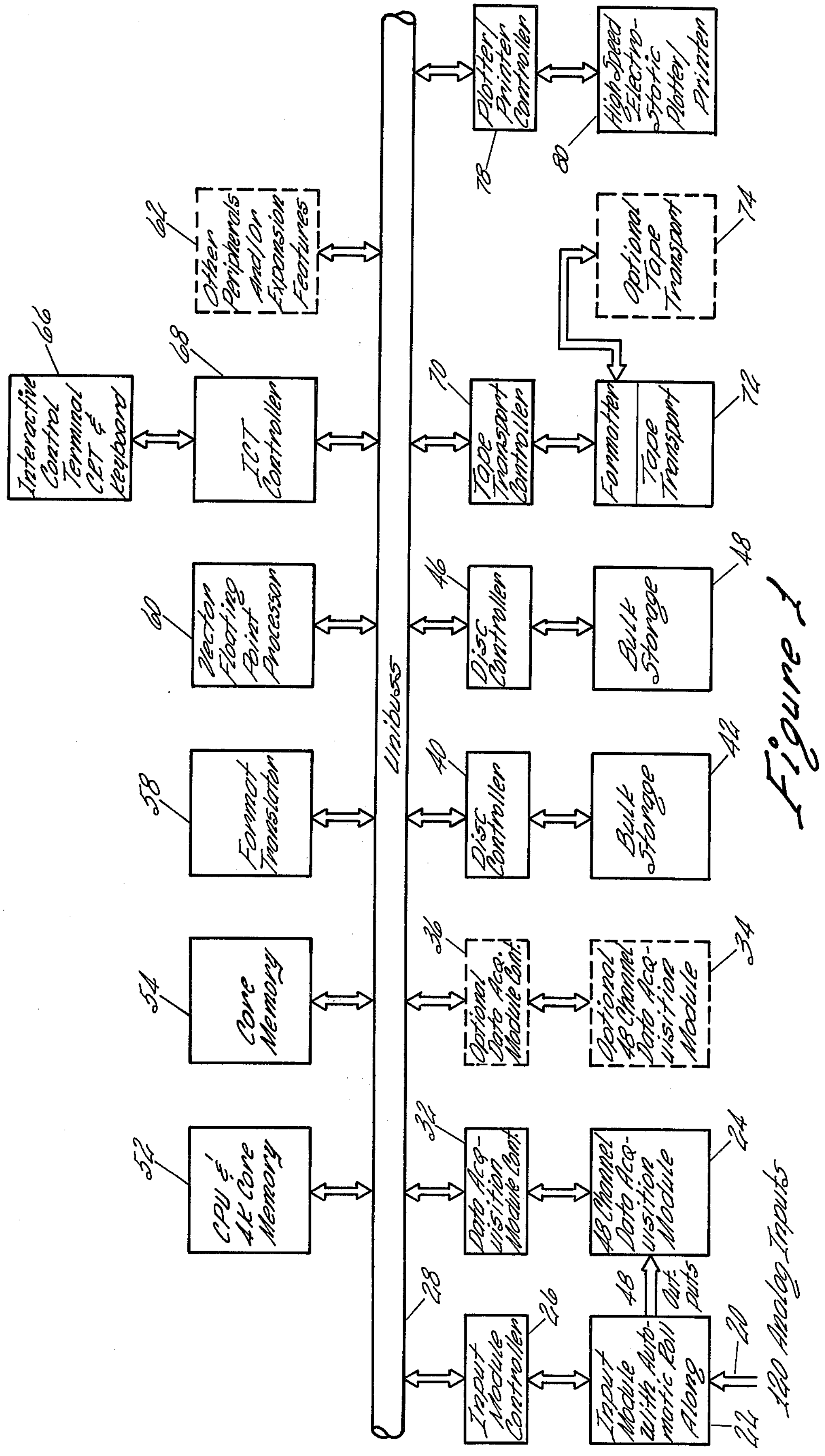
FIG. 1 is a block diagram of one embodiment of a seismic data acquisition system using the teachings of the invention.

FIG. 1 illustrates in block form, a preferred embodiment of a seismic data acquisition system utilizing the techniques of the present invention. The arrow designated by numeral 20 illustrates or represents analog signals received from means for detecting seismic energy in the earth, such as for example, geophones. One example of such a geophone is a digital grade geophone Model 20D manufactured and sold by Geo Space Corporation of Houston, Texas. The geophones are distributed in a predetermined pattern over the portion of earth for which seismic data is to be acquired. An energy source generates a seismic energy wave which is directed into the earth. The earth reflects the seismic energy back to the earth's surface, which is detected as the same is internally reflected by the earth, by a plurality of geophones. The geophones, represented by arrow 20, produce a plurality of analog signals in response to the detected seismic energy from the earth. The analog signals each have an amplitude and frequency within a known amplitude and frequency range. The geophones 20 may be designed to produce analog signals within a known amplitude and frequency range.

In the embodiment of FIG. 1, 120 analog inputs are represented by arrow 20. The 120 analog signals are applied to an input module 22 which has an automatic, preprogrammed switching device which samples less than 120 of the analog signals. The switching device is generally referred to as an automatic roll along switch which is well known in the art. In the embodiment of FIG. 1, the input module 22 samples 48 channels simultaneously. The 48 channels of analog signals are applied as an input to an acquisition module 24 under control of an input module controller 26.

The input module controller 26 is controlled by digital control signals transferred thereto from a digital signal control means. The digital signal control means in the embodiment of FIG. 1 is a digital unibuss 28.

Figure 2:
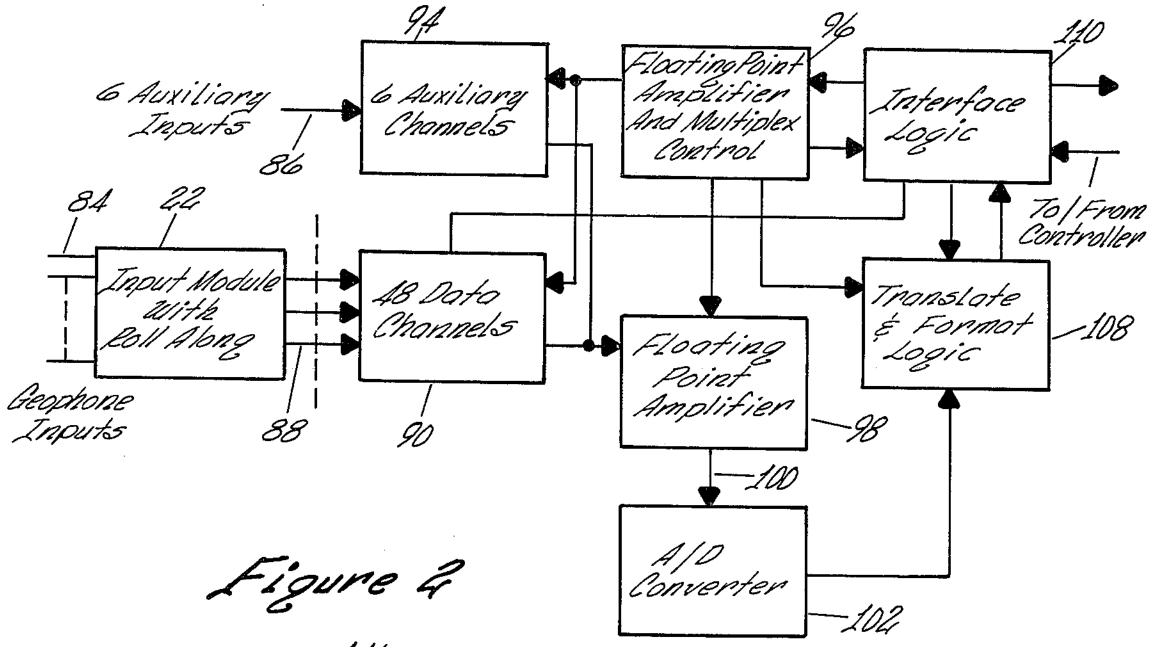
FIG. 2 is a block diagram representing processing of the analog signal from the geophone input, through the controlled gain amplifier to the analog to digital converter.
Figure 6:
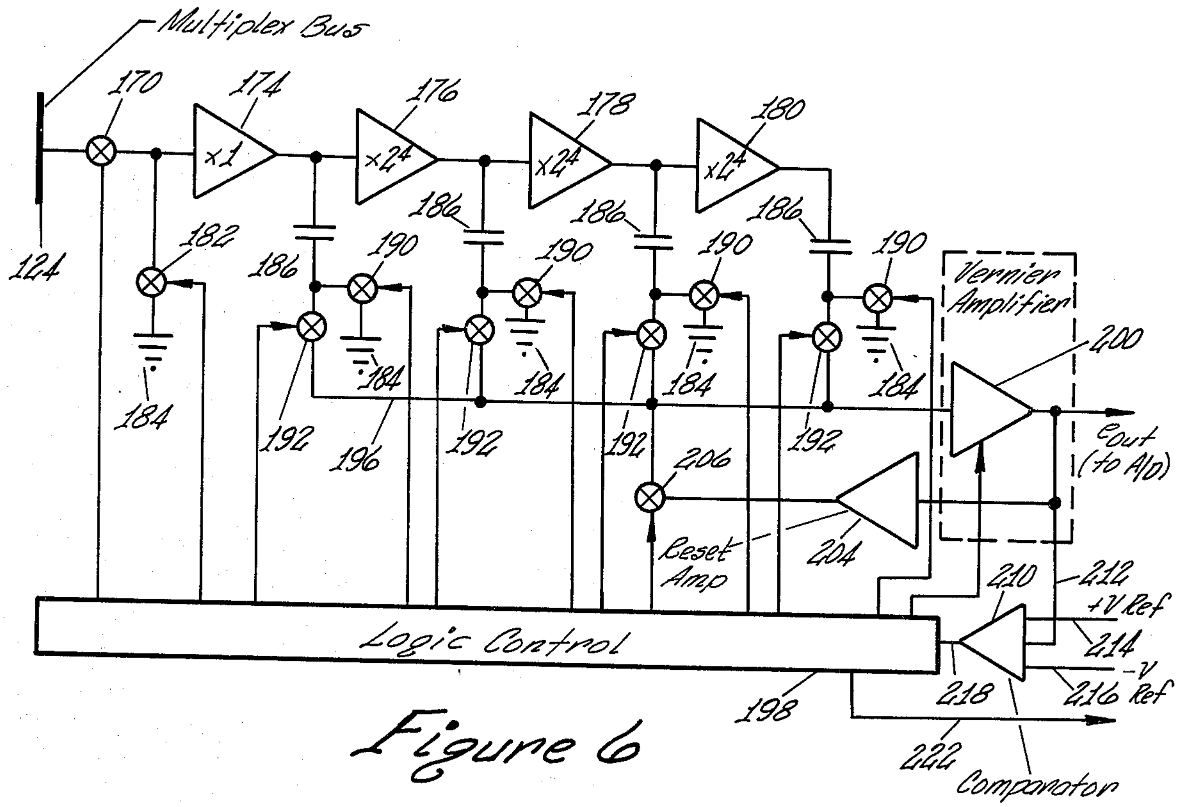
FIG. 6 is a block diagram of the controlled gain amplification system.

The data acquisition module 24 includes a controlled gain amplifier and an analog to digital convertor illustrated by FIGS. 2 and 6. The data acquisition module 24 is controlled by a data acquisition module controller 32. The data acquisition module controller 32 receives both digital data signals and digital control signals from the data acquisition module 24 and transfers the same to the digital unibuss 28. If desired, an additional data acquisition module 34 and a data acquisition module controller 36 may be utilized to acquire and process additional analog signals from the geophones represented by arrow 20.

Figure 4A:
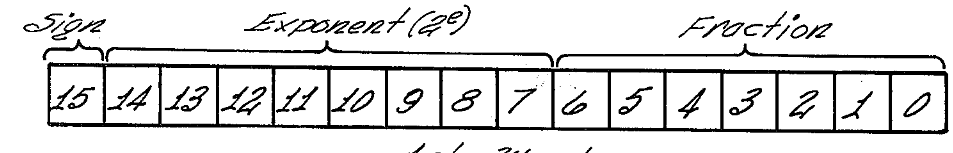
FIG. 4A and 4B are a representation of the binary coded 32 bit word containing digital data information and digital control information derived from the analog signal.
Figure 4B:
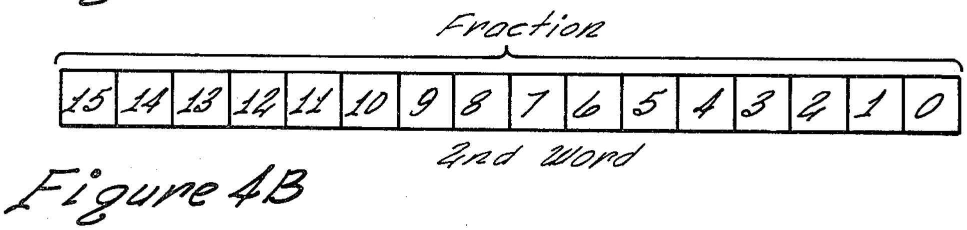

The acquired seismic data represented by the digial data signals and digital control signals is arranged in a 32 bit, binary format word as shown in FIG. 4A and 4B. These digital signals are transferred by the unibuss 28 to a disc controller 40 and stored on the surface of a rotating disc memory 42, generally known as bulk storage device. A second disc controller 46 and disc memory 48 maybe utilized if desired. The disc memory may be a 6,000,000 bit capacity, single disc, fixed head per track unit.

A digital computing means 52, such as a Digital Equipment Corporation Model PDP-11 computer, may be utilized to program and control operation of the various controllers and components. The digital computer includes a central processor and a memory means, such as for example a 4,096 bit core memory. The control processor is capable of controlling the input and output of digital information signals to and from the computer and between the central processor and core memory. The digital computer 52 function to control, in a programmed manner, all of the printer, operating sequences, transfer of data, input/output of data, transfer of digital signals between controlled functions and overall monitoring of the critical operations thereof. Add on core memory 54, e.g. 28K memory, may be used to store additional program information, processing routines, instructions, commands and data. The core memory 54 is controlled by digital computer 52 through the unibuss 28.

The digital signals comprising digital data signals and data control signals are capable of being processed on site by additional functional units; namely, a format translator 58, a vector floating point processor 60, or other peripherals of functional unit devices generally shown as 62.

An operator may use an input/output terminal means, such as for example, an interactive control terminal cathode ray tube (CRT) and keyboard 66 to communicate with and control the computer 52. An interactive control terminal controller 68 is connected between the terminal 66 and unibuss 28.

Digital data may be stored on either magnetic tape via transport controller 70 and magnetic tape recorder/reproducer 72 or on optional tape transport 74. Alternatively, the information may be generated as graphic indicia via a plotter/printer controller 78 operatively and high speed electrostatic plotter/printer 80 connected to unibuss 28.

Of the above described functional units, the floating point processor 60 together with the digital computer 52 provides the seismic data processing with its greatest capability. The floating point processor 60 is essentially a special designed arithmetic computer.

The vector floating point processor 60 must be capable of performing at least the following functions: (1) fast fourier analysis; (2) data stacking, that is, summing of digital data in real time; (3) automatic data processing including comparing processed data to stored charts, tables and reference signals, (4) accepting and-/or rejecting data based on comparison with stored or programmed data; and (5) performing data correlation and convolution which requires transforming the digital signals and reference digital signals into a frequency domain, multi-plying one signal in the frequency domain by the conjugate of the other in the frequency domain and transferring the signals back to time domain.

The above data processing capabilities are essential to processing of seismic data for generating meaningful seismic data in real time, which data can be, in turn, generated as graphic indicia on the printer/plotter 80, displayed via computer terminal 66 or otherwise stored on magnetic tape by recorder/reproducer 72.

One example of a floating point processor used in practicing this invention was a model PP-1-DEC 11 Floating Point Peripheral Processor sold by L-S Computing Corporation of Campbell California, adapted for use with Digital Equipment Corporation PDP-11 series computer.

Other floating processors which may be used are a Model FPS-40A sold by Floating Point Systems, Inc. of Portland, Oregon, and an array processor Model AP-120 sold by Culler-Harrison, Inc. of Goleta, California.

All of the above components and the entire seismic data acquisition system are capable of being mounted in a controlled environment housing mounted on a motor vehicle. Thus, the system with a digital computer can be brought into remote locations such as swamp areas, desert areas, range areas and the like. Heretofore, only seismic data acquisition system capable of recording seismic data as digital information on magnetic tape were used in such remote locations and processing and evaluation of the processed seismic data recorded on magnetic tape was done at data processing centers.

Thus, use of a digital computer to monitor, control and program operations of the acquisition and processing of seismic data and components of the entire system enables the operator to use the system to acquire, analyze and store seismic data at a higher acquisition rate and such seismic data is generally of more acceptable quality at the time it is acquired. In addition, by use of test cards and other such routines, the system operation and reliability is greatly increased and the down time of the entire seismic data acquisition system is held to a minimum.

The block diagram of FIG. 2 illustrates the flow of data from the geophones to a 32 bit, binary coded decimal word representing the seismic data. In operation, analog signals are directly received from the geophones. In this embodiment, 120 channels of analog signal data represented by leads 84 and 6 auxiliary channels of analog signal data represented by arrow 86 and inputs to the system. The input module roll along switch 22 is programmed to select 48 channels of data in a predetermined sequence to obtain stacking of data. The programming of the roll along switch to obtain data stacking is well known in the art and need not be described in detail. The selected 48 channels of data are represented by arrow 88. The 48 channels of data, represented by arrow 88 are multiplexed by pultiplexor 90. The 6 auxiliary channels of data, represented by arrow 88 is pre-processed, such as filtered, etc., by processor 94 and some of the signals are in turn applied as inputs to multiplexer 90. The analog signals from the processor 94 are used as reference or standard signals by the seismic data acquisition system. Some of the data is recorded as digital data signals and digital control signals for reference during processing of the seismic data.

The analog signals received as input signals are generally within a known amplitude and frequency range. The analog signals are essentially amplified by different amounts to produce amplified signals all within a predetermined range which is less than the original range of the signals. Thus, each signal is subject to a different amplification factor to bring it with the predetermined range. For example, some analog signals may subject to an amplification of 1 to bring its amplitude within the predetermined range while another analog signal may require an amplification of $2^{24}$ to bring its amplitude within the predetermined range. Thus, the required amplification of each and every analog signal must be programmed depending on its original amplitude. This function is controlled by a floating point amplifier and control unit 96, a floating point amplifier 98, sometimes referred to as a controlled gain amplifier 98, and an analog to digital convertor 102. The floating point amplifier control portion of unit 96 together with the floating point amplifier 98 form a controlled gain amplification system. The system produces an output signal having an amplitude within the predetermined range. The output signal appears on the output of the floating point amplifier 98 represented by lead 102, which output signal is the input to the analog to digital converter 102. The analog to digital converter 102 generates a digital data signal which appears on the output represented by lead 106. The output signal on lead 106 is applied to translate and format logic unit 108 which translates the digital data signal into the desired format illustrated in FIG. 4A and 4B.

The translated and formated digital data signal is transferred from translate and format logic unit 108 to an interface logic unit 110. The interface logic unit 110 also receives signals from the floating point amplifier and multiplex control unit 96. The signals from unit 96 contain information as to the amount that the analog signal was amplified by the floating point amplifier to bring the amplitude of the analog signal within the predetermined range. This amplification information is generated by the control unit 96 as a digital control signal which is transmitted to logic unit 110. Logic unit 110 then transfers the digital data signals and digital control signals via a controller, such as the data acquisition module controller 32, to the digital signal unibuss 28.

Figure 3:
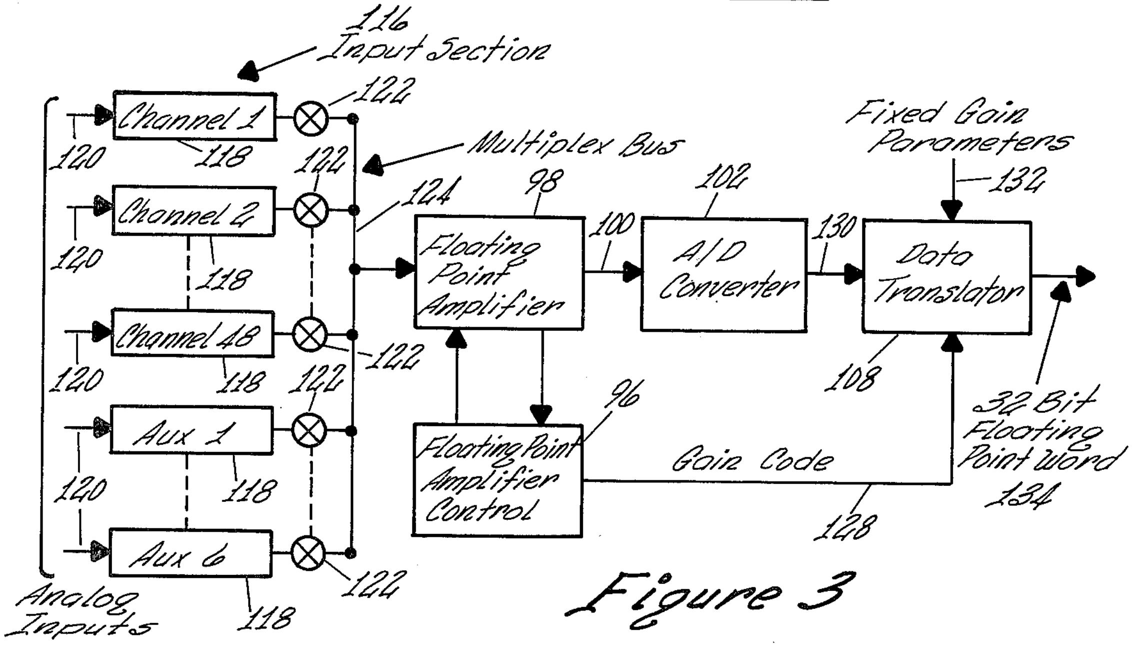
FIG. 3 is a block diagram of the multiplexer, input gating and other components for processing the analog signal.

FIG. 3 is a block diagram showing in greater detail the processing, amplification and digitizing the amplified analog signals. The input section, generally designated by arrow 116, includes processing electronics, designated by 118, which receive the analog signals from the detector as illustrated by leads 120. The signals received from each of the channels 1 – 48 and auxiliary channels 1–6 are applied as inputs to input gating means 122. The gating means 122 are controllably enabled to pass an analog signal from one of the channels to a multiplex buss 124 for input to the floating point amplifier.

Under control of the floating point amplifier control 96, the analog signal applied to floating point amplifier 98 is amplified to a predetermined amplitude. The gain or amplification required therefor is identified as a gain code or digital control signal which is applied via lead 128 to the data translator 108. In addition, the digital data signal from the A/D converter 102 is applied via lead 130 to the data translator 108. Certain reference signals establishing the fixed gain criteria is applied as an additional input represented by arrow 132, into the data translator 132. The data translator 108. The data translator 108 produces a 32 bit floating point word represented by output arrow 134.

FIG. 4A and 4B illustrate the format of the two words, 16 bits each, which form the 32 bit floating point word. In the first word shown by FIG. 4A, bit 15 designates the sign, e.g. negative or positive. Bits positon 7 to 14 inclusive represent the whole number exponent, to the base 2, of the significant number of the word. Between bit position 6 and 7, the word is assumed to have a decimal point. This representation is referred to as a hidden bit point. The remaining bit position 0 to 6 of the first word and all of the 0 to 15 bits inclusive of the second word represent the fractional portion of the digital data. By use of known translators, the format of the digital data can be changed into a different format such as, for example, the IBM short form floating point number format which is well known in the art.

Figure 5:
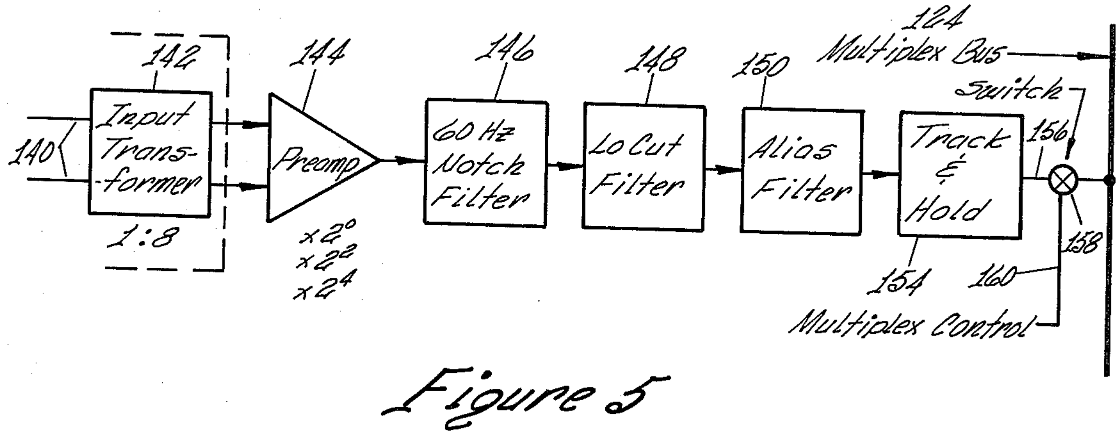
FIG. 5 is a block diagram showing the filtering of the analog signals prior to the multiplexing thereof.

FIG. 5 illustrates the electronic processing performed by processing electronics 118 of FIG. 3. The analog signal is applied across an indicator pair 140 which is connected to the input winding of an input transformer 142. The input transformer 142 step up the voltage level of the analog signal and applies the analog signal to preamplifier 144. The magntiude of the amplification of the preamplifier is selected as a function of the magnitude of the analog signal level. The output from the preamplifier is passed through a series of band pass filters to pass the analog signal at the desired known frequency. The band pass filters include a 60 Hz notch filter 146, a lo cut filter 148, an alias filter 156 which pass the filtered analog signal into a track and hold circuit 154.

The analog signal stored in the circuit 154 is applied as an input 156 to an AND gate 158 which is enabled by a signal applied to input 160 from a multiplex control which is part of the data acquisition module controller 32 of FIG. 1. When an enable signal is applied to AND gate 158 from input 160, the analog signal from track and hold circuit 154 is gated to the multiplex buss 124. The analog signal on the multiplex buss 124 is used as an input to the floating point amplifier 98.

FIG. 6 illustrates in block diagram the floating point amplifier 98, which is essentially a controlled gain amplification system.

The controlled gain amplification system includes an input gating means 170 which gates the analog signal from the multiplex buss 124 to the controlled gain amplifier.

The controlled gain amplifier includes a plurality of operational amplifiers 174, 176, 178 and 180, each having an input, an output and a preselected gain. The amplifiers 174, 176, 178 and 180 are cascaded or connected in a series circuit relationship. In the embodiment of FIG. 6, amplifier 174 has a pre-selected gain of one while amplifier 176, 178 and 180 have a gain of $2^4$. The input to amplifier 174, is also electrically connected to a gate 182 which when enabled connects the input of amplifier 174 to common ground 184.

In addition, each output of each operational amplifier, 174, 176, 178 and 180, is connected to an output gating means comprising separate output gates 190 and output gates 192 which are identified by common numerals on all amplifiers. Output gates 190, when enabled, connect each amplifier output to common ground 184. Output gates 192, when enabled, are connected to a common output terminal 196. The enable inputs to each of the gates 190 and 192 are controlled by a logic control means 198.

The common output terminal 196 is connected directly to a vernier amplifier 200 having an input, an output and a plurality of selectable predetermined gains. The input of vernier amplifier 200 is electrically connected to the common output terminal 196.

The output from the vernier amplifier 200 is the input to A/D converter. In addition, the vernier amplifier 200 output is connected to a reset amplifier 204 having an input, output and preselected gain. The input of reset amplifier 204 is connected directly to the output of vernier amplifier 200. The output of the reset amplifier is connected to a clamping gating means 206. The gating means 206 is also connected to and enabled by the logic control 198. The output of gating means 206 is connected to common output terminal 196.

The logic control means 198 is likewise connected to and is capable of setting the amplification of the vernier amplifier 200 at one of its preselected gains. In the embodiment of FIG. 6, the vernier amplifier has four preselected gains, $2^0$, $2^1$, $2^2$, or $2^3$.

A comparator 210 has three inputs 212, 214 and 216 and an output 218. Input 212 is directly connected to the output of vernier amplifier 200 and the signals therefrom is the input signal. Input 214, in this embodiment, has a positive voltage reference, V+, while input 216 has a negative voltage, V−. The output 218 has a control signal applied thereto from the comparator 210, the information contained therein being a function of the difference between the input signal on input 212 and one of the reference signal on input 214 and input 216.

The logic control means 198 receives and responds to the control signal applied thereto from input 218. In addition, the logic control means produces, as an output signal, a gain control code which appears on the output represented by arm 222.

In operation, an analog signal from the multiplex buss 124 is applied as one input to gating means 170. Logic control means 198 enables gate 170 passing the analog signal into operational amplifier 174. Output gates 190 connected to the output of all the amplifier 174, 176, 178 and 180 are enabled essentially disconnecting the output of amplifier 174 from the input of the next series connected amplifier 176 and charging coupling capacitor 186 connected between gate 190 and the output of amplifier 174.

Output gate 192, coupled via coupling capacitor 186 to the output of amplifier 174, is enabled passed the amplified signal to common output terminal 196. The gain of vernier amplifier 200 is set by logic control means 198 at $2^0$. The amplifier signal for vernier amplifier 200 is applied as an input to comparator 210. Comparator 210 produces a control signal representative of the difference between the reference signal, such as for example, on input 214. The control signal magnitude indicates to the logic control means 198 whether the amplified signal magnitude is within the predetermined range or whether additional amplification is required by any one of or all of the operational amplifiers 176, 178 and 180.

If additional amplification is required to bring the amplified signal amplitude within a predetermined range, the logic control means 198 will then set the gain of the vernier amplifier 200 at each preselected gain level to determine if the required amplification is obtained. If not, the amplified signal is transmitted to the next stage of amplification and the same sequence is repeated until the desired amplification is obtained.

Upon completion of the amplification sequence, the output signal is applied to D/A converter 102 in FIG. 3. Similarly, a gain code control signal is generated and appears on output 222 indicating the amount of amplification required to produce the output signal. The logic control means 198 then disables input gate 170 and enables clamping gating means 206 and one of the output gates 192. For example, output gate 192 connected to output of amplifier 174 may be enabled. Thus, a circuit is formed from the output of amplifier 174, through coupling capacitor 186, gate 192, common output terminal 196 and gate 206 to the output of reset amplifier 204. Reset amplifier 204 has its input connected to input 212 to comparator 210. A stabilizing or feedback voltage is developed from a diode network which forms a feedback loop across reset amplifier 204 (see FIG. 11, diode network 306), which voltage applied to lead 212 to clamp the capacitor 186 and output of the amplifier 174 to remove spurious signals and voltages therefrom by electrically driving the amplifier output to a voltage level determined by the resistors in and gain of reset amplifier 328. The clamping sequence is completed prior to input gate 170 being enabled to apply a subsequent analog signal to the floating point amplifier.

Figure 7:
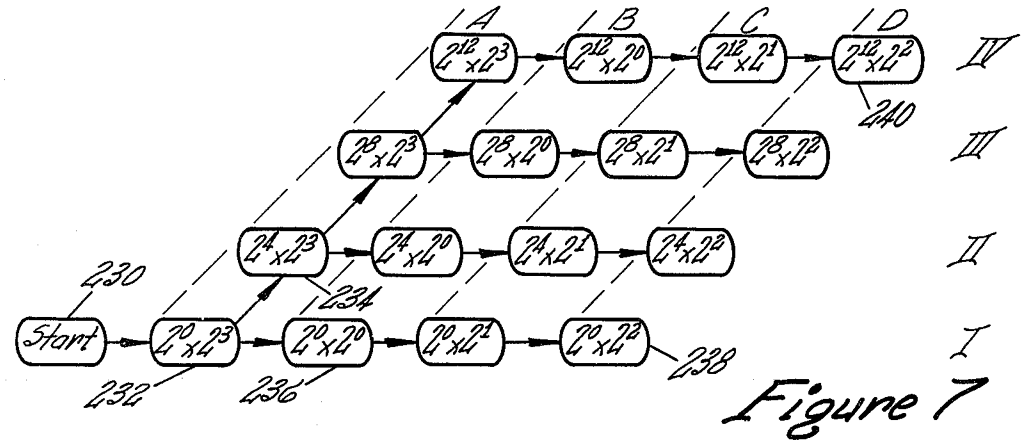
FIG. 7 is a pictorial representation of the programming amplification of the controlled gain amplification system.

FIG. 7 is a pictorial representation of the logical scheme utilized by the controlled gain amplifier in amplifying and comparing the amplified signal at each increment of the cycle. For example, the start point, represented by block 230, depicts the analog signal on the multiplex buss 124. The analog signal is transferred from the buss 124 to the first amplifier 174 in about 5 microseconds, which step is represented by block 232. In block 232, the $2^0$, represents the gain of amplifier 174 while the $2^3$, represents the gain of the vernier amplifier 200.

A decision is made by the logic control means 198 if more or less amplification is required to bring the amplitude of the amplified signal to within a predetermined range. If more amplification is required, then vernier amplified gain is held at $2^3$ and the amplified signal is passed to the next amplifier represented by block 234. In block 234 the $2^4$ represents the total gain of amplifier 174 and 176 while the $2^3$ represents the amplification of the vernier amplifier 200. Thus the total gain represented by block 234 is $2^{12}$.

If the amplified signal represented by block 232 requires less amplification, then the gain of the vernier amplifier 200 is reduced from $2^3$ to $2^0$ as shown in block 236. Thus the logical decision of more or less gain is determined as described above. As more gain is required, the higher level of amplification is obtained by selecting the required number of stages of amplification from the operational amplifier as shown by vertical levels I, II, III and IV on FIG. 7. Upon determining that an excess of amplification has been obtained, the lower levels or fine tuning of the amplification is obtained by adjusting the amplification of the vernier amplifier as shown by horizontal increments A, B, C and D. The maximum gain or amplification as shown by block 240 is $2^{24}$ and the minimum gain as shown by block 236 is $2^0$. Since all of the gain levels and increments at each level are related to the base 2, the gain code and digital control signals derived therefrom are binary coded.

In terms of timing, sequence time between levels is about 3 microseconds, while sequence time to switch between the increments at each level is about 5 microseconds.

Figure 8:
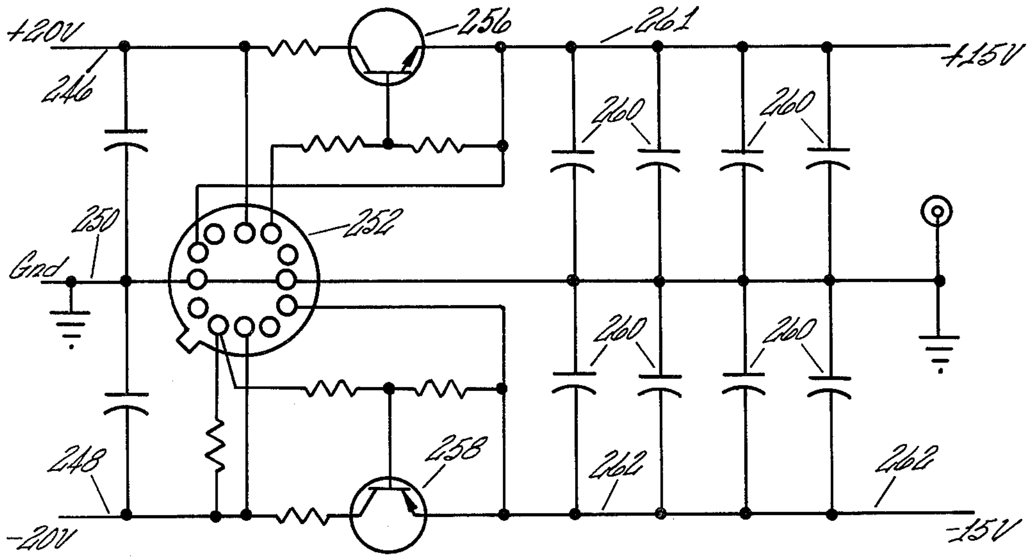
FIG. 8 is a schematic diagram of a power supply for a controlled gain amplifier.

FIG. 8 through 13, inclusive, show a preferred embodiment of a controlled gain amplification system. FIG. 8 illustrates a regulated power supply for the circuitry shown specifically in FIGS. 10, 11, 12 and 13. The input power to the power supply is a ±20VDC applied across input leads 246, 248 relative to common ground 250. The +20V appears on lead 246, while −20V appears on 248. Overall voltage regulation is obtained by means of a voltage regulator 252 such as a Beckman 844-V15. Regulation of the +20 VDC from lead 246 is provided by an NPN transistor 256. Regulation of the −20 VDC from lead 248 is provided by PNP transistor 258. Filter capacitors, generally designed as 260, are connected in parallel between common ground 250 and the regulated DC busses 260 and 262. The power regulated voltages across the DC buss are ±15VDC.

Figure 9:
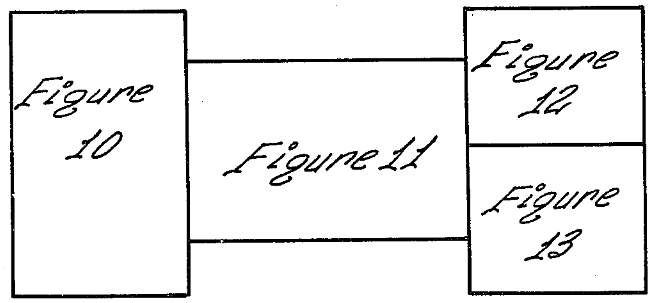
FIG. 9 is a pictorial representation of the relationship of the schematic diagram of the controlled gain amplifier represented by FIGS. 10, 11, 12 and 13.

FIG. 9 depicts the circuit relationship between the components forming the controlled gain amplifier disclosed by the schematic diagrams of FIGS. 10, 11, 12 and 13.

Figure 10:
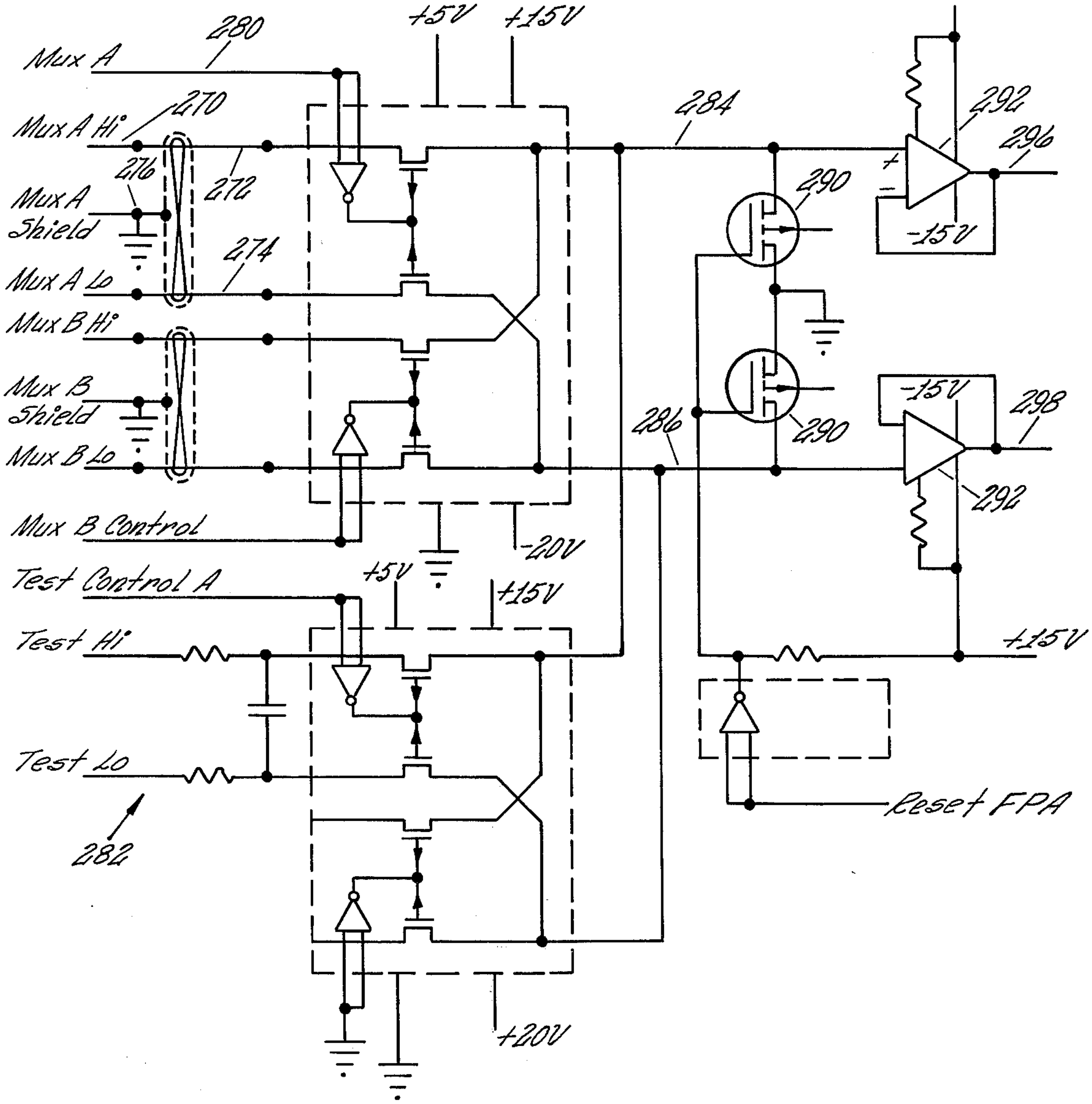
FIGS. 10, 11, 12 and 13, in combination, illustrate the preferred embodiment of a controlled gain amplifier.

FIG. 10 generally discloses two typical terminations for a shielded, twisted pair of conductors. One such twisted pair is generally designated 270 and comprises conductors 272 and 274 with a ground shield 276. Multiplexing control signals are applied via an input lead 280 to an integrated circuit (IC) such as a NH 0019 IC. Control and test signals may likewise be applied to the amplifier via control terminals generally designated by arrow 282. In response to an enabling signal on the appropriate multiplex control input lead, such as lead 280, an analog signal is applied to the multiplex buss comprising leads 284 and 286.

Figure 11:
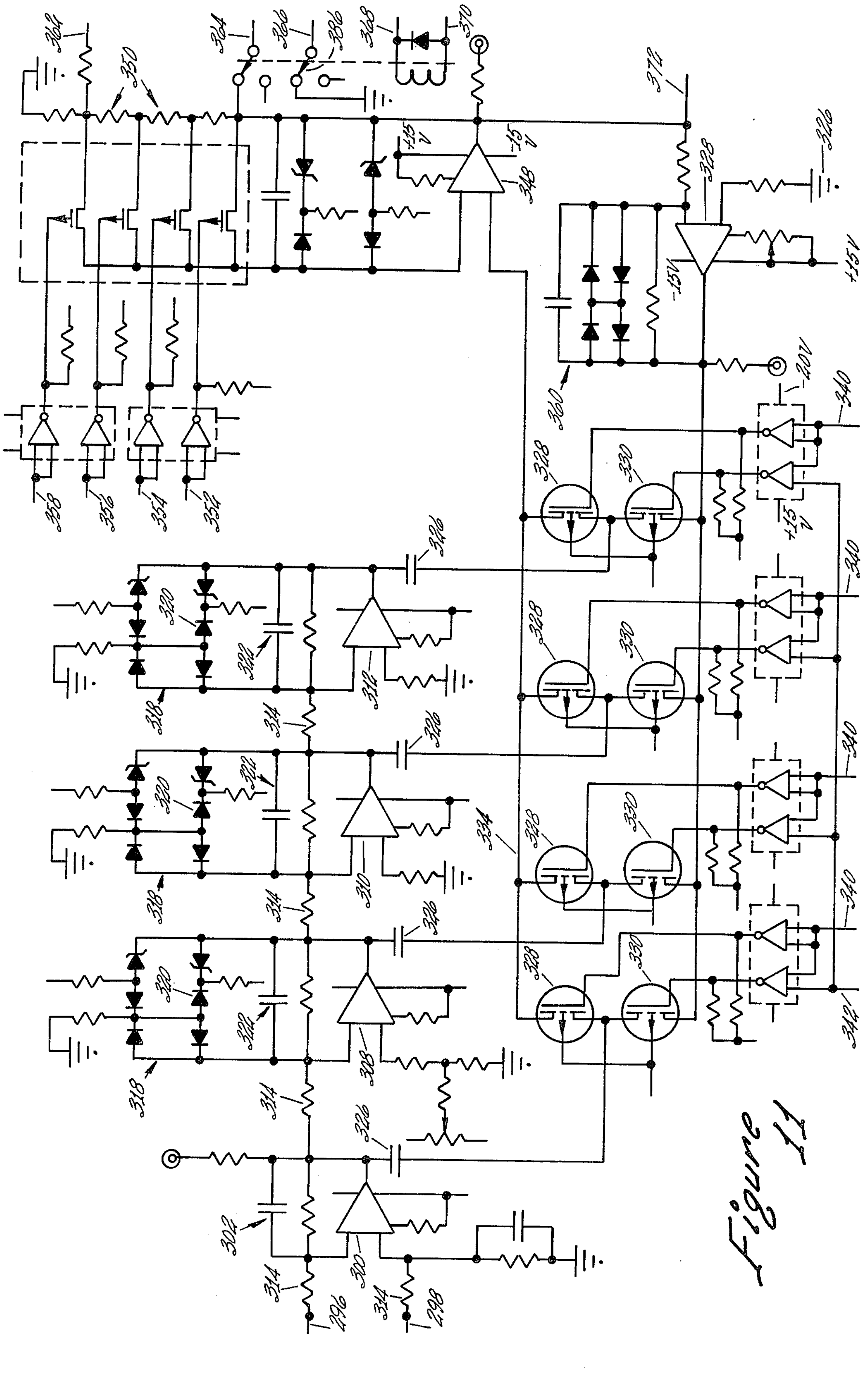

The analog signal on leads 284 and 286 are gated by MOS FET 290 and isolation amplifiers 292 onto the input terminal 296 and 298 to the first operational amplifier 300 in FIG. 11. The +15VDC is connected across the source and drain of MOS FETs 290 and across amplifiers 292 and 294 as shown in FIG. 10.

Figure 12:
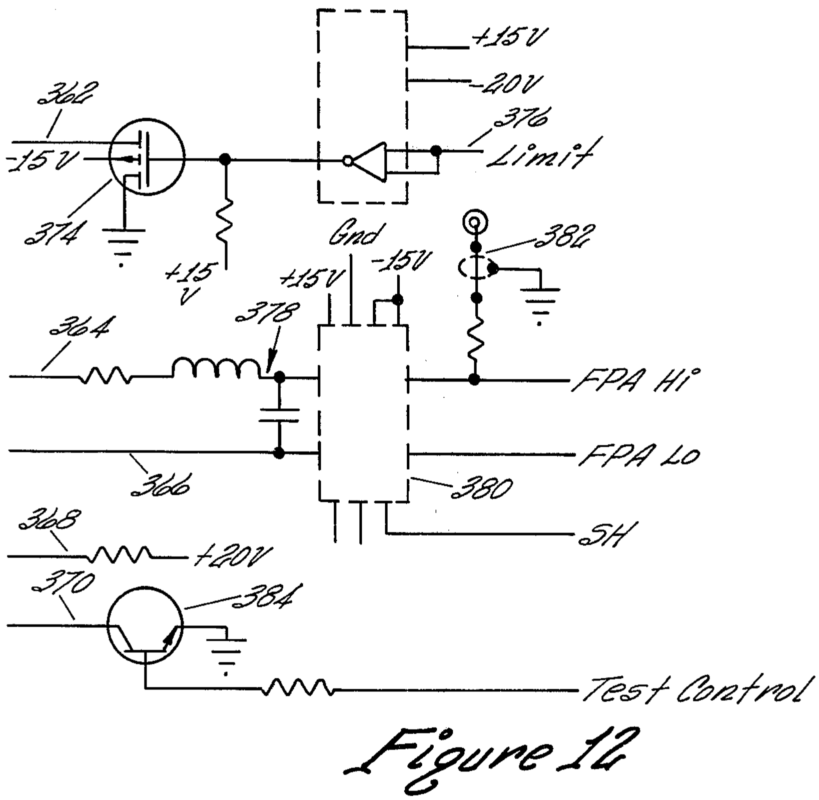

In FIG. 12, the gated analog signal on leads 296 and 298 is applied to operational amplifier 300. The operational amplifier 300 is selected to have an attenuation of 6 db and a preselected gain of $2^0$. The time operational amplifier is selected to have a relative short RC constant or reset time. Feedback is provided through a parallel RC feedback loop generally designated as 302.

The second, third and fourth operational amplifier are designated by numerals 308, 310 and 312 respectively. Each of these three amplifiers is selected to have a predetermined gain of $2^4$. The input signal is applied to the input of each amplifier via a single input resistor, all of the same value, generally designated as 314.

Each of the operational amplifier 308, 310 and 312 have identical feedback loops, generally designated as 318. Each feedback loop includes a diode matrix 320, and a parallel RC network 322. The diode matrix 320 functions to maintain a precise controlled voltage across the RC network 322.

Each output from operational amplifier 308, 310, 312 and 314 are connected through coupling capacitor 326 to two output gates formed by MOS FETs designated by common numerals 328 and 330. FETs 328 are electrically connected to selectively transmit in response to gating signals, the amplified signal from any one of the operational amplifiers 300, 308, 310 and 312 to a common output terminal 334. FETs 330 are electrically connected to selectively couple in response to gating signals, the output of each amplifier 300, 308, 310 and 312 to a common ground 326 via amplifier 328.

FETs 328 and 330 are gated in response to gating signals applied to leads 340 and 342 respectively. Switching and control of the MOS FETs, such as, for example 3N 163s, are obtained with DM8800 ICs. Each lead 340 is separately enabled to transmit the amplified signal to the next stage while lead 342 simultaneously enables all FETs to reset the same.

Common output terminal 334 is connected to a vernier amplifier 348. The preselected gains of the amplifier are obtained through an IC and resistor network 350, using, for example, a MM451 IC. Switching and setting of the preselected gains is provided in response to control signals on leads 352 for $2^0$, lead 354 for $2^1$, lead 356 for $2^2$, and lead 358 for $2^3$ through an IC such as MM451.

Amplifier 328 functions as a reset amplifier to clamp or drive the output of an operational amplifier to a stabilizing voltage determined by the resistance and gain of the reset amplifier 328 derived from a diode network 360 forms a feedback loop for amplifier 328. The clamping of the outputs of the operational amplifiers via coupling capacitors 326 is accomplished by the reset amplifier 328 driving an amplifier output to a voltage level determined by the gain of the reset amplifier 328 established by the feedback network 360 to eliminate spurious signals and voltages therefrom. The clamping sequence is performed after amplification of an analog signal and prior to amplifier 300 receiving the next analog signal as an input thereto.

Figure 13:
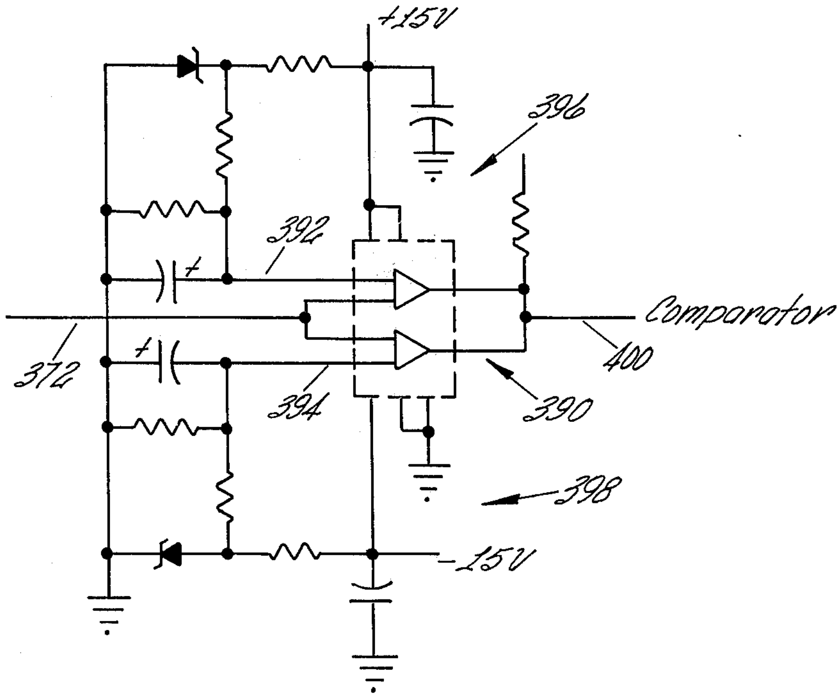

Conductors 362, 364, 366, 368 and 370 are common to the circuitry of FIG. 12 while conductor 372 is common with the comparator circuitry of FIG. 13.

Lead 362 in FIG. 12 is connected to a MOS FET 374 which, when enabled with a signal on control lead 376, limits the preselected gain of vernier amplifier 348 of FIG. 11.

Leads 364 and 366 in FIG. 12 have the output signal appearing thereacross, which signal is passed through an RLC network 378 and IC 380 ultimately to output lead 382.

Leads 368 and 370 in FIG. 12 are controlled by NPN transistor 384 to switch poles 386 of FIG. 11 into a test mode.

FIG. 12 has lead 372 connected to a comparator 390. The lead 372 applies the output signal from vernier amplifier 348 of FIG. 11 as the input signal to the comparator 390. The positive and negative reference voltage inputs to comparators are applied thereto by input leads 392 and 394 respectively. The positive reference voltage on lead 392 is producted by network 396 while the negative reference voltage on lead 394 is produced by network 398. The control signal produced by the comparator 390 appears on output 400. Output 400 is applied to the logic control means 198 of FIG. 6 to selectively control the enabling of input 340 in FIG. 11.

It is pointed out that as the voltage on the comparator network 396 and 398 reach the threshold of the zener diodes therein, the magnitude of the reference voltage decreases.

The seismic data acquisition system as described in connection with this preferred embodiment is one example of a system method and amplification system for utilizing the teachings of this invention. Additional functional units, an improved vector floating point processor and other such functional units may be independently improved. Such improvements are anticipated to improve the operational capabilities of the seismic data acquisition system and method disclosed herein

What is claimed is:

1. A controlled gain amplification system for producing an output signal within a predetermined amplitude range in response to input signals having amplitudes which vary over a known amplitude range greater and less than the predetermined amplitude range comprising input gating means;

means for applying input signals to said input gating means;

a plurality of operational amplifiers each having an input, an output and a preselected gain, said operational amplifiers being electrically connected in series circuit relationship with the input of the first operational amplifier in the series circuit relationship connected to the input gating means and being adapted to receive the input signals therefrom, each of said operational amplifier having at its output an amplified signal, the amplitude of which is determined by the amplitude of the signal applied to the input thereof times the preselected gain thereof;

output gating means electrically connected to the output of each operational amplifier for controlling the transmission of the amplified signal therefrom to at least one of a common output terminal and the input of the next series connected operational amplifiers;

a vernier amplifier having an input, an output and a plurality of selectable predetermined gains, the input of the vernier amplifier being electrically connected to the common output terminal and adapted to have an amplified signal from any one of the series connected operational amplifiers applied thereto by the output gating means as an input signal to the vernier amplifier and for producing an output signal therefrom having an amplitude within the predetermined amplitude range;

a reset amplifier having an input and an output with feedback network connected thereacross and the output electrically connected to said output gating means for selectively clamping and driving the output of each operational amplifier to a stabilizing voltage level determined by reset amplifier gains;

a comparator having a reference input and a signal input with the signal input electrically connected to the output of the vernier amplifier; and control means electrically connected to the vernier amplifier and to the comparator for enabling the input gating means and the output gating means for transmitting an amplified signal between the operational amplifiers and the common output terminal in response to a difference signal generated by the comparator from the reference signal and the output signal from the vernier amplifier and for controllably setting the gain of the vernier amplifier at one of the predetermined gains to produce an output signal therefrom within the predetermined amplitude range, the control means being adapted to enable the output gating means to selectively clamp at least one of the outputs from the operational amplifiers at the stabilizing voltage source removing spurious signals from the clamped operational amplifier output and common output terminal.

2. The controlled gain amplification system of claim 1 wherein there are four series connected operational amplifiers wherein the gain of the first series connected operational amplifier is $2^0$ and the gain of each of the other operational amplifier is $2^4$.

3. The controlled gain amplification system of claim 2 wherein the vernier amplifier selectable predetermined gains are $2^0$, $2^1$, $2^2$, $2^3$.

4. The controlled gain amplification system of claim 3 wherein the reset amplifier gain is $2^0$.

5. The controlled gain amplification system of claim 3 wherein the reference voltage to the comparator is one of a positive reference voltage or a negative reference voltage.

6. The controlled gain amplification system of claim 5 wherein said reference voltage level is reduced by a predetermined voltage differential when the amplitude of the amplified signals exceeds a threshold voltage.

7. A seismic data acquisition system comprising in combination means for detecting seismic energy in the earth and producing a plurality of analog signals in response thereto, said analog signals each having an amplitude and frequency within a known amplitude and frequency range;

means operatively coupled to the detecting means for multiplexing the analog signals;

a controlled gain amplifier operatively coupled to said multiplexing means for receiving and amplifying the analog signal applied thereto from said multiplexing means with a selected amplification obtained from a plurality of series connected operational amplifiers to produce an output analog signal having an amplitude within a predetermined amplitude range, said controlled gain amplifier having a reset amplifier having an input and an output;

a feedback network electrically connected across the input and output of said reset amplifier; and means electrically connected between the output of the reset amplifier and each of the operational amplifiers for clamping prior to the controlled gain amplifier receiving an analog signal, each of the operational amplifiers to the voltage level determined by the gain of the reset amplifier to remove spurious signals therefrom eliminating spurious signals from said output analog signal;

means operatively connected to the controlled gain amplifier for converting the output analog signal to a digital data signal representing the seismic information in the output analog signal;

means operatively connected to the controlled gain amplifier for generating a digital control signal representing the amplification of the analog signal by the controlled gain amplifier; and means operatively connected to the analog to digital converting means and to the digital control signal generating means for storing the digital data signals and the digital control signals as the acquired seismic data derived from the seismic energy.

8. The seismic data acquisition system of claim 7 further comprising digital signal control means for transferring said digital data signals and said digital control signals from said digital to analog converting means and said control means;

floating point processing means electrically connected to said digital signal control means to receive said digital data signals and said digital information signals; and computing means including a central processor and memory means electrically connected to said digital signal control means, said floating point processing means and said storing means for retrieving, processing and controlling transferring of the digital data signals and the digital control signals therebetween.

9. The seismic data acquisition system of claim 8 further comprising input/output terminal means electrically connected to said digital control means and said computing means for enabling an operator to enter data and control information thereto and to receive the same therefrom.

10. The seismic data acquisition system of claim 9 further comprising printing means electrically connected to said digital signal control means and said computing means to produce graphic indicia representing said digital data signals and digital control signals.

11. The seismic data acquisition system of claim 10 further comprising

12. The method of acquiring seismic data comprising the steps of detecting seismic energy in the earth and producing in response thereto a plurality of analog signals each having an amplitude which is within a known amplitude range;

multiplexing said analog signals; and gating said multiplexed analog signal to a controlled gain amplifier capable of amplifying the analog signal with a programmable amplification to produce an output analog signal having an amplitude within a predetermined amplitude range which is less than said known amplitude range;

amplifying said analog signal with at least a first of a plurality of series connected operational amplifiers to produce an amplified analog signal;

controlling transmission of the amplified analog signal within the controlled gain amplifier with an output gating means to one of the operational amplifier next in said series circuit relationship and to a vernier amplifier having a plurality of predetermined gains and capable of being set at one of said predetermined gains by a control signal;

comparing the amplified analog signal from each operational amplifier prior to transmission thereof with a reference signal to produce the control signal to program the amplification required to produce an output analog signal having an amplitude within the predetermined range;

enabling the output gating means with the control signal to control transmission of the amplified analog signal to said one of the next operational amplifier in said series circuit relationship and said vernier amplifier;

setting the gain of said vernier amplifier at one of said predetermined gains in response to said control signal to produce an output analog signal therefrom amplified by at least one of the operational amplifiers and having an amplitude within the predetermined amplitude range;

clamping each operational amplifier in a predetermined sequence, prior to the controlled gain amplifier receiving an analog signal, with the output gating means to a reset amplifier having a feedback network for removing spurious signals from the clamped operational amplifier;

converting the output analog signal to a digital data signal representing the seismic information in the output analog signal;

generating a digital control signal representing the programmed amplification of the analog signal by the controlled gain amplifier in producing the output analog signal having an amplitude within said predetermined amplitude range; and storing the digital data signals and the digital control signals as the acquired seismic data derived from the seismic energy.

13. The method of claim 12 further comprising the steps of processing the digital data signals and the digital control signals with a floating point processor; and producing a graphic indicia of the processed digital data signals and the digital control signals derived from the seismic data representing the detected seismic energy in the earth.

14. The method of claim 12 further comprising the steps of directly receiving detected analog signals as reference signals; and processing and storing said reference analog signals as digital data signals together with digital control signals.

* * * * *